US006621893B2

(12) United States Patent
Elzur

(10) Patent No.: US 6,621,893 B2
(45) Date of Patent: Sep. 16, 2003

(54) COMPUTER TELEPHONY INTEGRATION ADAPTER

(75) Inventor: Uri Elzur, Zichron-Yaacov (IL)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 09/772,732

(22) Filed: Jan. 30, 2001

(65) Prior Publication Data

US 2002/0101965 A1 Aug. 1, 2002

(51) Int. Cl.$^7$ ............................................... H04M 11/00
(52) U.S. Cl. ................................ 379/93.05; 379/90.01; 379/399.01; 379/413.02; 370/352
(58) Field of Search ........................... 379/90.01, 93.01, 379/93.05–93.08, 93.37, 110.01, 399.01, 413.02–413.04; 370/351–356, 401, 410, 422, 463, 468

(56) References Cited

FOREIGN PATENT DOCUMENTS

| CA | 2216036 | * | 3/1999 |
| CA | 2273713 | * | 12/1999 |

* cited by examiner

*Primary Examiner*—Wing Chan
(74) *Attorney, Agent, or Firm*—Pillsbury Winthrop LLP

(57) ABSTRACT

A computer telephony integration adapter for a telephone system includes a network interface to transmit data to, and receive data from, a network. A network controller is provided to transmit data to, and receive data from, the network interface. The network controller is adapted to package data being transmitted to the network and to unpackage data being transmitted to the telephone system. A telephony interface is also provided to transmit data to, and receive data from, the telephone system. The computer telephony integration adapter also includes a traffic steering device to sort data received from the telephone system, the network, and a computer interface, and to transmit data appropriately to the telephone system, the network, and the computer interface. A signaling device is provided to transmit signaling data to, and receive signaling data from, the telephone system, and to transmit signaling data to, and receive signaling data from, the network. A voice and signaling separator is also provided to receive data from the telephony interface, to separate telephony data and signaling data from the data, to transmit the telephony data to the traffic steering device, and to transmit signaling data to the signaling device. The computer telephony integration adapter is capable of independent operation regardless of a state of a host system connected to the computer interface.

30 Claims, 2 Drawing Sheets

COMPUTER TELEPHONY INTEGRATION ADAPTER

BACKGROUND OF THE INVENTION

1. Field of the Invention

The present invention generally relates to a computer telephony integration adapter, and more specifically, to a network interface card (NIC) capable of utilizing existing analog telephone systems, as well as digital and serial bus connected telephone systems, such as a Universal Serial Bus (USB), for computer-based telephone applications.

2. Discussion of the Related Art

Many homes and businesses utilize two separate networks in order to handle computer data and telephone data. The telephone systems used in many organizations run on a dedicated network, such as a private branch exchange (PBX), that is de-coupled from the data network, such as a local area network (LAN) or the Internet. The cost for maintaining two separate networks for voice and data access is high. The typical cost of operating a PBX connection in a large business for a single employee is about $1,000 per year. Additionally, the PBX and the handsets coupled thereto are generally part of a closed architecture system that prevents open-market competitive products.

Use of a computer system, e.g., a personal computer (PC), to place telephone calls over a network connection such as the Internet, is becoming more popular. PC-based telephone applications may utilize special telephone systems, such as Internet Protocol telephones (IP phones) or software-based IP phones, in order to place calls over the Internet. IP phones, however, differ from existing analog telephone systems and digital telephone systems. Therefore, in order for a large organization to utilize PC-based telephone applications, new IP phones must be purchased and re-deployed throughout the organization. Moreover, an IP phone requires power from a main power outlet, or that the host computer system to which it is connected be activated and operational to provide power and other functionality to the IP phone. An IP phone may also derive power from the network if the network and the IP phone are properly equipped to do so.

DETAILED DESCRIPTION

Figure 1:
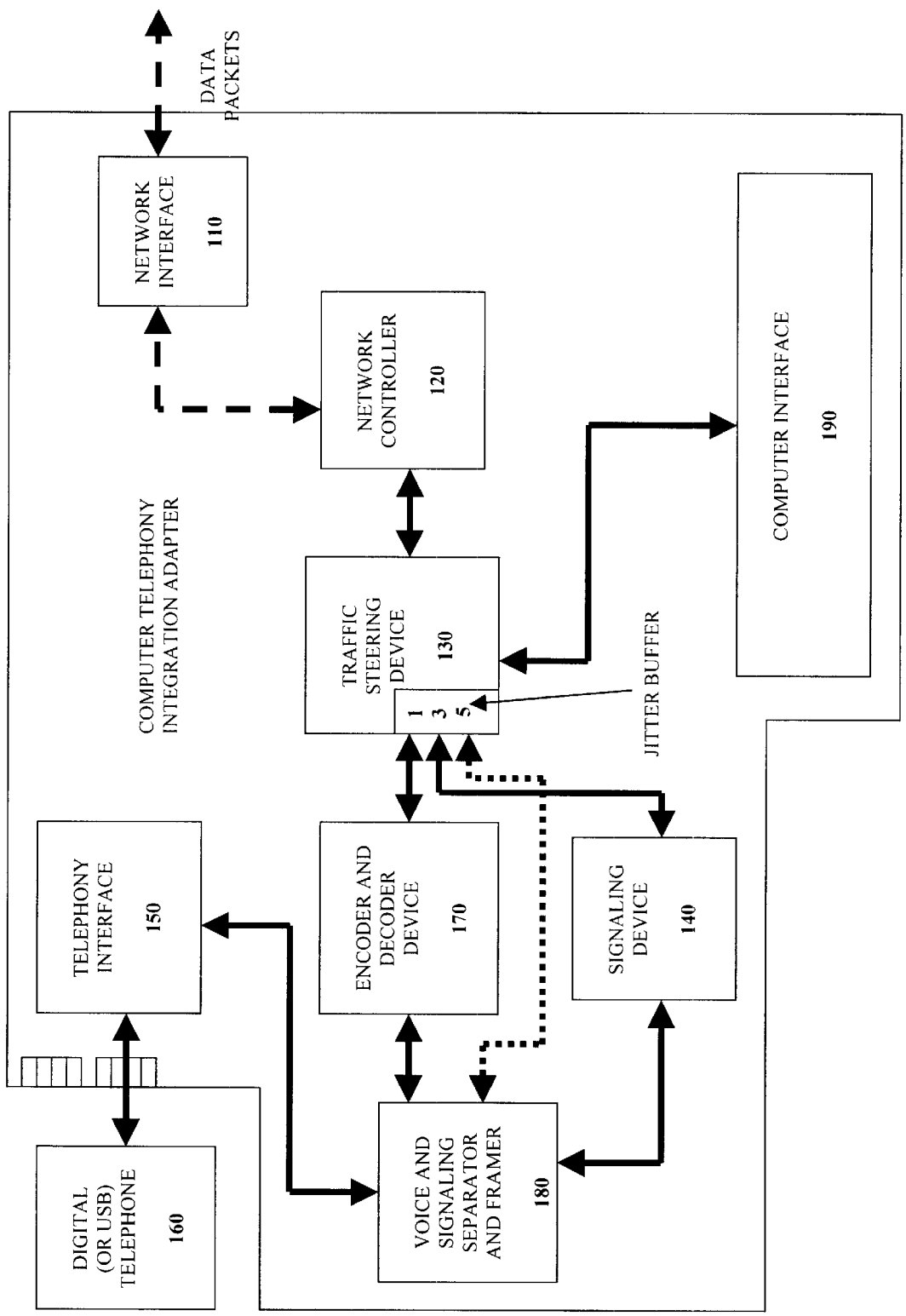
FIG. 1 illustrates the components of a computer telephony integration adapter for a digital telephone system according to an embodiment of the present invention.

FIG. 1 illustrates the components of a computer telephony integration adapter for a digital telephone system according to an embodiment of the present invention. The computer telephony integration adapter is preferably a network interface card (NIC), that may be inserted into a computer interface 190 on a motherboard of a host computer system, like a Peripheral Component Interconnect (PCI) interface slot. However, any suitable computer interface and connector may be utilized.

The telephone system 160 may be connected to the computer telephony integration adapter via a telephony interface 150, which in the case of a digital telephone system, may include a RJ-11-type phone jack. In the case of a USB telephone system, the telephony interface 150 may include a USB port. The telephony interface 150 itself may include an additional backup telephone line interface to connect to a redundant traditional telephone line, in the event that the network connection fails, and also to generate consumer confidence in the product, especially during its initial deployment periods. The telephony interface 150 basically facilitates the transmission of data to and reception of data from the telephone system 160. The telephony interface 150 may also be adapted to sort control data, telephony data, and framing data. The computer telephony integration adapter may be connected to a network, such as a local area network (LAN) or the Internet, via a network interface 1 10 having, for example, a RJ-45-type jack for connecting to an Ethernet cable. Any other suitable connection schemes may be utilized for connecting the computer telephony integration adapter to the telephone system 160 and to the network.

A network controller 120 is provided to receive data from the network through the network interface 110. The network controller 120 is also adapted to receive data from the telephone system 160 for transmission to the network. Preferably, the network controller 120 is capable of packaging data into network data packets (e.g., IP frames) for transmission to the network, as well as unpackaging network data packets received from the network so as to transmit the data downstream to the telephone system 160. For example, a protocol that may be utilized for packaging telephony data (i.e., voice data) over the network is the Real-Time Transport Protocol (RTP) (a Layer-4 Open Systems Interconnect (OSI) Transport Layer), set forth by the Internet Engineering Task Force (IETF), Request for Comments (RFC) number 1889, dated January 1996. RTP is an Internet protocol for transmitting real-time (streaming) data, such as audio and video. RTP itself does not guarantee real-time delivery of data, but it does provide mechanisms for sending and receiving applications to support streaming data. Typically, RTP runs on top of the User Datagram Protocol (UDP), although the specification is general enough to support other transport protocols. UDP is a connectionless protocol that runs on top of Internet Protocol (IP) networks. Other protocols suitable for transporting streaming data may also be utilized.

Data that has been unpackaged by the network controller 120 goes to a traffic steering device 130. The traffic steering device 130 receives data from the telephone system 160 and/or the computer interface 190 for transmission to the network, and receives data from the network for transmission to the computer interface 190 and/or the telephone system 160. The traffic steering device 130 sorts out the data received from the various sources, determines their destinations, and transmits the data accordingly. For example, network data transmitted to the network controller 120 may include data for the host computer system and the telephone system 160. Therefore, the traffic steering device 130 determines which data is to be routed to the computer interface 190 (and ultimately to the host computer system) and which data is to be routed to the telephone system 160. Once that determination is made, the data intended for the host computer system is transmitted to the computer interface 190, and the data intended for the telephone system 160 is transmitted thereto.

A jitter buffer 135 may be incorporated with the traffic steering device 130, or provided separately downstream from the traffic steering device 130 in the computer telephony integration adapter. The jitter buffer 135 provides a signal-processing function that is implemented at the receiving end of a packet-based network to buffer incoming packets, rearrange them into the correct order, and output them at a constant rate to ensure smooth playback. Because of the nature of data packet transmissions, data packets may arrive "out-of-order" to the network interface 110, or may never arrive at all. Therefore, the jitter buffer 135 provides a mechanism to receive the data packets and provide the data downstream once the jitter buffer 135 determines that enough data packets have been received to forward downstream to the telephone system 160.

The data being transmitted to the telephone system 160 may be of different types, including telephony data (i.e., voice data) and signaling data (data containing information as to which telephone system to announce an incoming call, etc.). As shown in FIG. 1, signaling data may be transmitted from the traffic steering device 130 to a signaling device 140, which is adapted to receive signaling data from the network and to convert and transmit the signaling data to the telephone system 160 in a format that is acceptable to the telephone system 160. Alternatively, the signaling device 140 may be adapted to receive signaling data from the telephone system 160 and to convert and transmit the signaling data to a format that may be transported over the network to, for example, indicate an incoming call at a remote telephone system. The data transmitted from the network to the telephone system 160 goes through the telephony interface 150 (which may be adapted to support an analog, a digital, or a USB phone, etc.), to which the telephone system 160 is connected. The telephone system 160 may ring, flash, etc., upon receipt of the signaling data to indicate the presence of an incoming call. The signaling data may utilize any suitable protocol, including the Internet Engineering Task Force (IETF) Media Gateway Control Protocol (MGCP), draft of Nov. 9, 1998.

An encoder and decoder device 170 may be incorporated into the computer telephony integration adapter. Many digital telephone systems have built-in coder/decoders (codecs) that are capable of receiving and transmitting telephony data straight from and to the network. In one embodiment, the telephony data is transmitted and received in a format compatible with the codec, and an encoder and decoder device 170 is not required. In such a configuration, the telephony data transmitted to the telephone system 160 from the traffic steering device 130 is transmitted to the telephony interface 150 without having to pass through an encoder and decoder device 170, but still through a voice and signaling separator and framer 180. However, if a newer (e.g., the International Telecommunications Union (ITU) G.723 "Dual Rate Speech Coder for Multimedia Communications Transmitting at 5.3 and 6.3 kbit/s" format, adopted Mar. 1996; the ITU G.728 "Variable Bit-Rate Operation of Low-Delay Code-Excited Linear-Prediction (LD-CELP) Mainly for Voiceband-Data Applications in Digital Circuit Multiplication Equipment (DCME)" format, adopted September 1999; and the ITU G.729 "Coding of Speech at 8 kbit/s Using Conjugate-Structure Algebraic-Code-Excited Linear Prediction (CS-ACELP)", adopted March 1996, etc.) or incompatible format is utilized for transport of the telephony data over a network, then the telephony data is first passed through the encoder and decoder device 170, which translates the incoming telephony data into a format acceptable to the telephone system 160. Conversely, telephony data transmitted from the telephone system 160 may be required to be encoded for transport over the network by the encoder and decoder device 170 as well.

When required, the encoder and decoder device 170 may utilize the ITU G.711 Pulse Code Modulation (PCM) of Voice Frequencies standard, adopted November 1988 ("the G.711 standard"), to encapsulate and decapsulate data packets of the telephony data. The G.711 standard allows the encoding and decoding of telephony audio on a 64 kbps channel. Many digital telephone systems 160 already have a G.711 standard codec incorporated within, and therefore, these digital telephone systems 160 do not require the use of an encoder and decoder device 170, and may receive telephony data from the traffic steering device 130, as well as transmit telephony data directly from a voice and signaling separator and framer 180 to the traffic steering device 130. But, it may still require additional/different framing processing to be handled by the telephony interface 150. However, if another telephony standard were utilized, then an encoder and decoder device 170 would be required to encode and decode the telephony data into and from a format that is acceptable to the telephone system 160 connected to the computer telephony integration adapter.

Because existing digital telephone systems transmit telephony data and signaling data within the same data stream, a voice and signaling separator and framer 180 is utilized to separate the telephony data and the signaling data, as each type of data is packaged differently by the network controller 120 for transmission over the network. The voice and signaling separator and framer 180 is also adapted to place data into the proper frame format being transmitted to and from the telephone system 160. As stated above, telephony data transmitted from the telephone system 160 may be required to be encoded by the encoder and decoder device 170 into an acceptable format for transmission over the network. Therefore, separating the telephony data from the signaling data is desirable so that only the telephony data is passed to the encoder and decoder device 170 and only signaling data is passed to the signaling device 140. If the telephone system 160 is a USB phone, then, an encoder and decoder device 170 may be required because USB phones typically do not have a built-in codec capable of receiving and generating telephony data in an appropriate format for network transport. However, an encoder and decoder device 170 would not be required for any telephone system 160 that is capable of accepting the format of the telephony data being transmitted to and from the network.

For example, the voice and signaling separator 180 may utilize the International Telecommunications Union (ITU) Q.931 Integrated Services Digital Network (ISDN) User-Network Interface Layer 3 Specification for Basic Call Control protocol, adopted May 1998, (the Q.931 protocol). The Q.931 protocol, or its variants, may be used to provide functionality to the voice and signaling separator and framer 180 to separate the voice (telephony) data from the signaling data in the data stream transmitted from the telephone system 160 to the network.

Outgoing data from the telephone system 160 (telephony data and/or signaling data) is transmitted to the traffic steering device 130 directly from the voice and signal separator and framer 180, from the signaling device 140, or from the encoder and decoder device 170. The traffic steering device 130 then forwards the data to the network controller 120. Particularly, telephony data received at the network controller 120 is preferably packaged into RTP packets for transport over the network via the network interface 110.

The computer telephony integration adapter may be configured so that the telephone system 160, along with the computer telephony integration adapter itself, is capable of receiving and transmitting calls even if the host computer system is powered down or inoperable. Typically, the computer telephony integration adapter and the telephone subsystem 160 may draw power from the host computer system through the computer interface 190, such as the PCI port. The computer telephony integration adapter may also have an additional power plug to receive power from a wall outlet to provide supplemental/auxiliary power. The telephone system 160 too may also draw power directly from the host computer system, or from a wall outlet. However, if power from the host computer system is unavailable, or insufficient (because the PCI port provides approximately 375 milliamps, which may be insufficient to power the telephone system 160), power may be drawn off the network connection, such as the Ethernet connection, utilizing a proposed Institute of Electrical and Electronics Engineers (IEEE) 802.3af standard, approved Jan. 30, 2000, known as "Power over LAN", in order to power the computer telephony integration adapter and the telephone system 160 connected thereto. Therefore, unlike existing PC-based telephones that require the host computer system to be powered on and operational, the computer telephony integration adapter is self-sufficient and not dependent upon the host computer system for any processing functionality or operating power, and may be functional even if the host computer is powered off or inoperable (e.g., crashed), retaining the same functionality and reliability as a private branch exchange (PBX)-based digital phone.

Additionally, because the computer telephony interface adapter is coupled the computer interface 190, via the PCI port, for example, computer-enhanced features may be provided to the user as well. For example, the host computer may be adapted to provide "telephone-like" services to the user, by providing audio from a telephone call to the user via external speakers (through an audio sound card, for example), and receive audio input from the user via a microphone. The host computer may also be adapted to handle other tasks, such as acting as an answering machine, caller identification, or even voice recognition to identify a caller.

Figure 2:
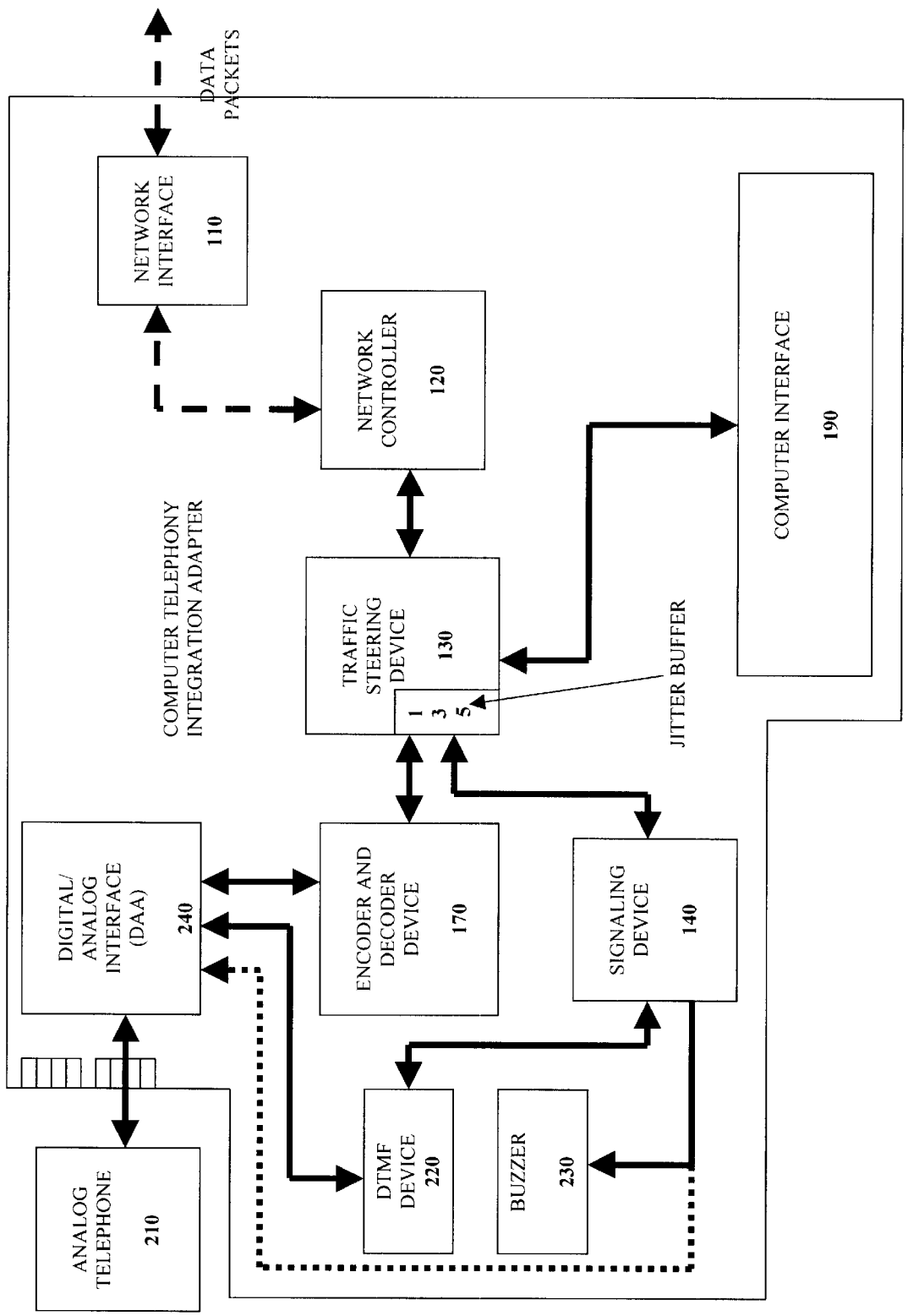
FIG. 2 illustrates the components of a computer telephony integration adapter for an analog telephone system according to an embodiment of the present invention.

FIG. 2 illustrates the components of a computer telephony integration adapter for an analog telephone system according to an embodiment of the present invention. The computer telephony integration adapter for an analog telephone system shares many of the components discussed above with respect to a digital or USB telephone system 160.

The analog telephone system 210 may be connected to a digital/analog interface 240, such as a data access arrangement (DAA). The digital/analog interface 240 may also include a RJ-11 type phone jack for connection to the analog telephone system 210. The digital/analog interface 240 is adapted to receive and convert digital signals into analog signals (e.g., into different voltage levels) transmitted to the analog telephone system 210. The digital/analog interface 240 is also adapted to receive and convert analog signals from the analog telephone system 210 into digital signals for transmission to the network. The digital/analog interface 240 may also include an additional backup telephone line interface to connect to a redundant traditional telephone line. The digital/analog interface 240 also acts as a separator of dual-tone multi-frequency (DTMF) data and voice data.

The computer telephony integration adapter for an analog telephone system may be connected to a network via a network interface 110 having, for example, a RJ-45-type jack for connecting to an Ethernet cable. The network interface 110 facilitates the transmission of data between the network and the computer telephone integration adapter.

A network controller 120 is provided to receive data from the network through the network interface 110. The network controller 120 is also adapted to receive data from the analog telephone system 210 for transmission to the network. Preferably, the network controller 120 is capable of packaging data into network data packets (e.g., IP frames) for transmission to the network, as well as unpackaging network data packets received from the network so as to transmit the data downstream to the analog telephone system 210. As noted above, one protocol that may be utilized for packaging telephony data is the Real-Time Transport Protocol (RTP).

Data that has been unpackaged by the network controller 120 goes to a traffic steering device 130. The traffic steering device 130 may receive data from the analog telephone system 210 and/or the computer interface 190 for transmission to the network, or may receive data from the network for transmission to the computer interface 190 and/or the analog telephone system 210. The traffic steering device 130 sorts out the data received from the various sources, determines their destinations, and transmits the data appropriately. Once the determination is made, the data intended for the host computer system is transmitted to the computer interface 190, and the data intended for the analog telephone system 210 is transmitted thereto. Additionally, as in FIG. 1 above, a jitter buffer 135 may be incorporated with the traffic steering device 130, or provided separately downstream from the traffic steering device 130 in the computer telephony integration adapter.

As discussed above, the data being transmitted to the analog telephone system 210 may be of different types, such as telephony data (i.e., voice data) and signaling data (data containing information as to which telephone system to announce an incoming call). Signaling data may be transmitted from the traffic steering device 130 to a signaling device 140, which receives the signaling data from the network and converts the signaling data into a signal that is adapted to ring, for example, a buzzer 230 incorporated with the computer telephony integration adapter. By ringing a buzzer 230 incorporated with the computer telephony integration adapter, as opposed to ringing the buzzer of an analog telephone system 210, lower voltages may be utilized, thus lowering the cost of operation. Higher voltages are required to ring a buzzer of a conventional analog telephone system 210, requiring on average of about 110 volts. When the computer telephony integration adapter is utilizing the "Power over LAN" feature or PCI auxiliary power, the power levels required to ring a buzzer within a conventional analog telephone system 210 may not be available, and the ability to ring a buzzer 230 utilizing lower power levels is particularly desirable. However, if the computer telephony integration adapter has available sufficient power, then the signaling device 140 may transmit a signal to the analog telephone system 210 itself (through the digital/analog interface 240) to ring the buzzer within the analog telephone system 210.

The signaling device 140 is also adapted to send and receive signaling data from the analog telephone system 210, through a dual-tone multi-frequency (DTMF) device 220, and to convert and transmit the signaling data into a format that may be transported over a network to indicate an incoming call at a remote telephone system. Because analog telephone systems 210 utilize DTMF signals to indicate the number pressed on the telephone keypad, the DTMF device 220 receives and translates the DTMF signals into signaling data (such as those generated from a digital or USB telephone system) that is acceptable to the signaling device 140. After receiving the signaling data from the DTMF device 220, the signaling device 140 transmits the signaling data to the traffic steering device 130, which ultimately transmits the signaling data out to the network to indicate an incoming call at a remote telephone system.

An encoder and decoder device 170 is also provided with the computer telephony integration adapter for the analog telephone system 210. The encoder and decoder device 170 receives and decodes telephony data transmitted from the network to the analog telephone system 210. Generally, specific protocols are utilized for transmitting telephony data, and the encoder and decoder device 170 decodes the incoming telephony data so as to allow the digital/analog interface 240 to receive the telephony data and to convert the digital signals into analog signals (e.g., different voltage levels) for transmission to the analog telephone system 210. Additionally, telephony data transmitted from the analog telephone system 210, after being converted into digital signals by the digital/analog interface 240, is passed through the encoder and decoder device 170 so as to encode the telephony data into a format of a specific protocol or standard utilized for transmission over the network connection.

Outgoing data from the analog telephone system 210 (telephony data and/or signaling data) is transmitted to the traffic steering device 130, directly from the encoder and decoder device 170 or the signaling device 140. The traffic steering device 130 then forwards the data to the network controller 120. Telephony data received at the network controller 120 is preferably packaged into RTP packets for transport over the network via the network interface 110. However, any other suitable protocol used to transport the telephony data may be utilized.

The computer telephony integration adapter "mimics" the operation of a PBX (for a digital phone) or Central Office (CO) (for an analog phone) system so that telephone systems, including digital, USB, and analog telephone systems, believe that their connections are to a typical PBX or Central Office system, and not to a host computer system having computer telephony capabilities. In the computer telephony integration adapter in FIG. 1, it may be connected to a network, such as the Internet, to which an IP-to-PBX device may be connected, which in turn connects to a PBX. The computer telephony integration adapter provides a liaison between the telephone system and the network so that telephone calls may be made over a network connection utilizing existing telephone systems. That is, on one hand, the computer telephony integration adapter appears to be a typical PBX or Central Office system to the telephone systems connected to it, while on the other hand, to the network, the computer telephony integration adapter appears to be a conventional network adapter on a computer system for transmitting and receiving network data. Therefore, new telephone systems are not required by businesses or individuals wishing to utilize computer telephony and to integrate their voice and data networks into a single system, and there is no need to replace the existing telephone systems. Moreover, the computer telephony integration adapter is capable of independent operation regardless of a state of the host computer system (such as a workstation computer, desktop computer, etc.) connected to the computer interface 190.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of receiving data at a telephone system having computer telephony integration, comprising:

receiving data from a network;

unpackaging the data received from the network;

sorting the data to transmit the data appropriately to the telephone system and to a computer interface;

separating signaling data and telephony voice data from the data transmitted to the telephone system;

receiving signaling data, directed to the telephone system, from the data received from the network for indicating an incoming call; and receiving telephony voice data from the data received from the network at the telephone system.

2. The method according to claim 1, further including the step:

decoding the telephony data prior to reception at the telephone system.

3. The method according to claim 1, wherein the telephone system is a digital telephone system.

4. The method according to claim 1, wherein the telephone system is a serial bus connected telephone system.

5. The method according to claim 1, wherein the telephony data unpackaged from the network are in real-time transport (RTP) protocol packets.

6. The method according to claim 2, wherein the telephony voice data is decoded from a G.711 pulse code modulation (PCM) protocol.

7. The method according to claim 2, wherein the telephone system is an analog telephone system.

8. A method of transmitting data from a telephone system having computer telephony integration to a network, comprising:

transmitting the data from the telephone system;

determining and separating telephony voice data from signaling data for indicating an incoming call directed to another telephone system of the data transmitted from the telephone system;

packaging at least one of the telephony voice data and the signaling data for transmission to the network; and transmitting the at least one of the telephony voice data and the signaling data to the network.

9. The method according to claim 8, further including the step:

encoding the telephony voice data for transmission to the network.

10. The method according to claim 8, wherein the telephone system is a digital telephone system.

11. The method according to claim 8, wherein the telephone system is a serial bus connected telephone system.

12. A method of transmitting data from an analog telephone system having computer telephony integration to a network, comprising:

transmitting the data from the analog telephone system;

receiving dual-tone multi-frequency (DTMF) signals from the data transmitted from the analog telephone system;

determining signaling data for indicating an incoming call directed to another telephone system from the DTMF signals;

encoding telephony voice data from the data transmitted from the analog telephone system for transmission to the network;

packaging at least one of the telephony voice data and the signaling data for transmission to the network; and transmitting the at least one of the telephony voice data and the signaling data to the network.

13. The method according to claim 12, wherein the telephony data packaged from the network are in real-time transport (RTP) protocol packets.

14. The method according to claim 12, wherein the telephony data is encoded in a G.711 pulse code modulation (PCM) protocol.

15. A computer telephony integration adapter, comprising:

a network interface to transmit data to, and receive data from, a network;

a network controller to transmit data to, and receive data from, the network interface, wherein the network controller is adapted to package data being transmitted to the network, and to unpackage data being transmitted to a telephone system;

a telephony interface to transmit data to, and receive data from, the telephone system;

a traffic steering device to sort data received from the telephone system, the network, and a computer interface, and to transmit data appropriately to the telephone system, the network, and the computer interface;

a signaling device to transmit signaling data for indicating an incoming call directed to the telephone system to, and receive signaling data from, the telephone system, and to transmit signaling data for indicating an incoming call directed to another telephone system to, and receive signaling data from, the network; and a voice and signaling separator to receive data from the telephony interface, to separate telephony voice data and signaling data from the data, to transmit the telephony voice data to the traffic steering device, and to transmit signaling data to the signaling device.

16. The computer telephony integration adapter according to claim 15, further including:

an encoder and decoder device to receive, encode, and transmit telephony voice data from the voice and signaling separator to the traffic steering device, and to receive, decode, and transmit telephony voice data from the traffic steering device to the voice and signaling separator.

17. The computer telephony integration adapter according to claim 15, wherein the telephone system is a digital telephone system.

18. The computer telephony integration adapter according to claim 15, wherein the telephone system is a serial bus connected telephone system.

19. The computer telephony integration adapter according to claim 15, wherein the network controller packages telephony data into real-time transport (RTP) protocol packets.

20. The computer telephony integration adapter according to claim 15, wherein the computer interface is a Peripheral Component Interconnect (PCI) interface.

21. The computer telephony integration adapter according to claim 15, wherein the telephony interface includes a telephone system interface to connect to the telephone system, and a backup telephone line interface to connect to a redundant telephone line.

22. The computer telephony integration adapter according to claim 16, wherein the encoder and decoder device utilizes a G.711 pulse code modulation (PCM) protocol.

23. The computer telephony integration adapter according to claim 15, wherein the computer telephony integration adapter is capable of independent operation regardless of a state of a host computer system connected to the computer interface.

24. A computer telephony integration adapter, comprising:

a network interface to transmit data to, and receive data from, a network;

a network controller to transmit data to, and receive data from, the network interface, wherein the network controller is adapted to package data being transmitted to the network, and to unpackage data being transmitted to an analog telephone system;

a digital/analog interface to receive and convert digital signals to analog signals transmitted to the analog telephone system, and to receive and convert analog signals to digital signals transmitted from the analog telephone system;

a traffic steering device to sort data received from the analog telephone system, the network, and a computer interface, and to transmit data appropriately to the analog telephone system, the network, and the computer interface;

an encoder and decoder device to receive and encode telephony voice data for transmission to the network from the digital/analog interface, and to receive and decode telephony voice data for transmission to the digital/analog interface from the traffic steering device;

a dual-tone multi-frequency (DTMF) device to receive DTMF signals from the digital/analog interface and to determine signaling data for indicating an incoming call directed to the telephone system from the DTMF signals; and a signaling device to receive signaling data from the dual-tone multi-frequency (DTMF) device, and to transmit signaling data for indicating an incoming call directed to another telephone system to, and receive signaling data from, the traffic steering device.

25. The computer telephony integration adapter according to claim 24, further including:

a buzzer adapted to receive signaling data from the signaling device, and to generate a signal indicating an incoming call.

26. The computer telephony integration adapter according to claim 24, wherein the signaling device transmits signaling data to the digital/analog interface for transmission to the analog telephone system to generate a signal indicating an incoming call.

27. The computer telephony integration adapter according to claim 24, wherein the network controller packages telephony data into real-time transport (RTP) protocol packets.

28. The computer telephony integration adapter according to claim 24, wherein the computer interface is a Peripheral Component Interconnect (PCI) interface.

29. The computer telephony integration adapter according to claim 24, wherein the digital/analog adapter includes an analog telephone system interface to connect to the analog telephone system, and a backup telephone line interface to connect to a redundant telephone line.

30. The computer telephony integration adapter according to claim 24, wherein the encoder and decoder device utilizes a G.711 pulse code modulation (PCM) protocol.

* * * * *